United States Patent Office 2,786,857
Patented Mar. 26, 1957

2,786,857
PROCESS FOR PRODUCING 17-HYDROXY-DESOXYCORTICOSTERONE

Frank A. Cutler and John M. Chemerda, Metuchen, N. J., assignors to Merck & Co., Inc., Rahway, N. J., a corporation of New Jersey No Drawing. Application March 22, 1954,
Serial No. 417,960

2 Claims. (Cl. 260—397.47)

This invention relates to novel steroid compounds and processes of obtaining the same. More particularly, it is concerned with a process for converting pregnenolone to $\Delta^4$-3,20-diketo-17α,21-dihydroxy-pregnene and $\Delta^4$-3,20-diketo-17α-hydroxy-pregnene, and with novel steroid compounds useful in the preparation of these compounds.

This application is a continuation-in-part of our copending application Serial No. 326,576, filed December 17, 1952.

The discovery of the remarkable effectiveness of cortisone and similar related compounds in the treatment of various diseases has stimulated great interest in finding other methods of preparing these compounds.

It is an object of the present invention to provide a process for the preparation of $\Delta^4$-3,20-diketo-17α,21-dihydroxy-pregnene (Reichstein's Substance S), an active adrenal hormone and $\Delta^4$-3,20-diketo-17α-hydroxy-pregnene. It is a further object to provide novel derivatives of pregnenolone which are useful as intermediates in the synthesis of these products. Another object is to provide processes for the preparation of said intermediates. Other objects will be apparent from the detailed description of our invention hereinafter provided.

In accordance with the present invention, we have found that $\Delta^4$-3,20-diketo-17α,21-dihydroxy-pregnene can be prepared from pregnenolone ($\Delta^5$-3-hydroxy-20-keto-pregnene) by a process which can be represented as follows:

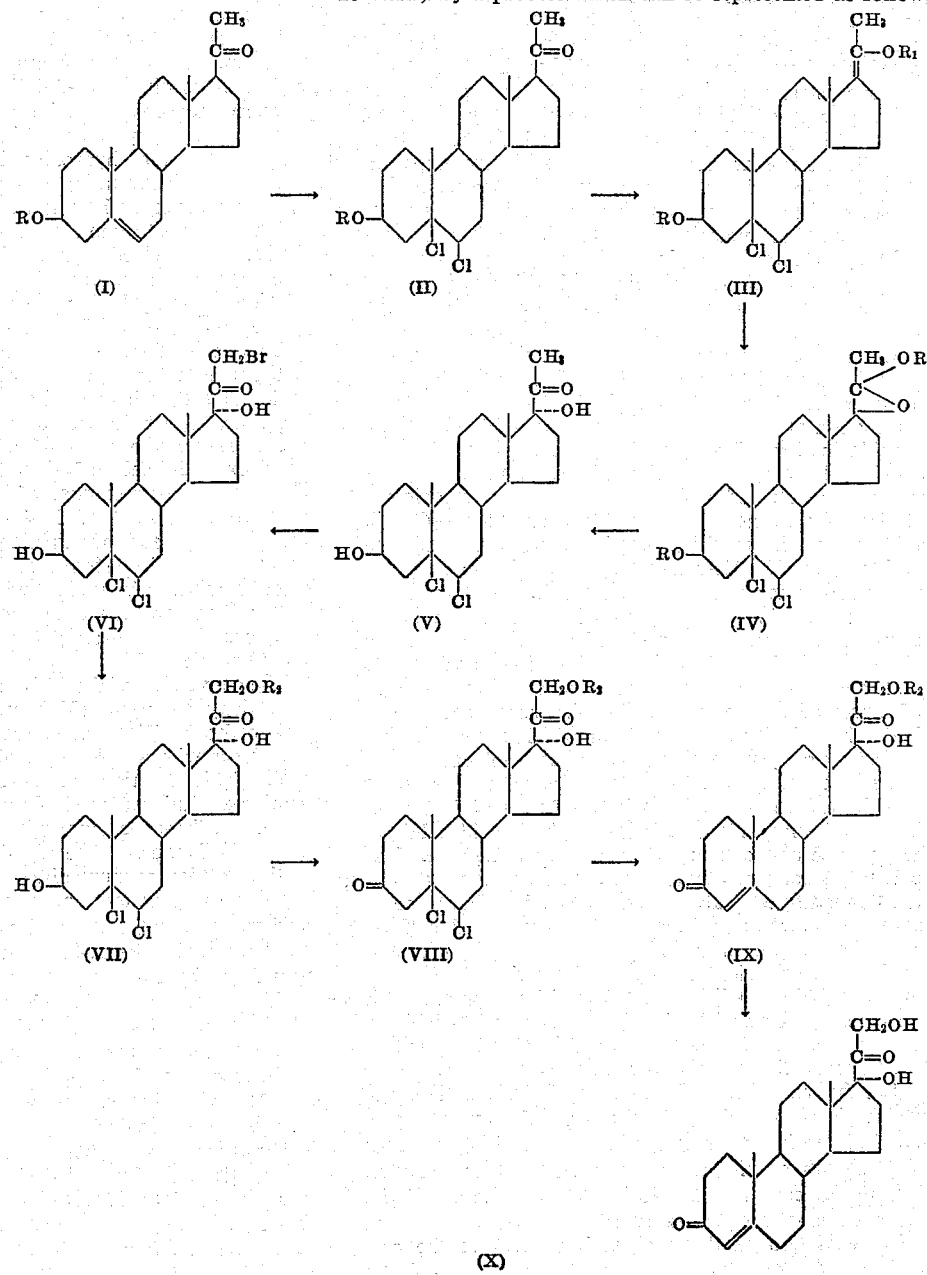

wherein R represents an acyl substituent, and $R_1$ and $R_2$ represent lower aliphatic acid radicals.

In this process, an acyl derivative of pregnenolone (I) is first chlorinated to saturate the $\Delta^5$-unsaturated group and obtain the corresponding dichloro derivative (II) which is then acylated to produce the corresponding $\Delta^{17}$-20-enol acylate derivative (III). Upon reacting the enol acylate with an oxidizing agent the corresponding 17,20-epoxide (IV) is obtained which on hydrolysis is converted to the 17α-hydroxy-20-keto compound (V). The latter compound is then reacted with bromine to produce the corresponding 21-bromo compound (VI) which is converted to the 21-acyloxy compound (VII) by treatment with a salt of a lower aliphatic acid. Upon treating VII with an oxidizing agent the corresponding 3-keto compound (VIII) is obtained which upon treatment with a dehalogenating agent forms the 21-acylate of $\Delta^4$-3,20-diketo-17α,21-dihydroxy-pregnene (IX). Upon hydrolysis with alkali this ester is cleaved to produce Reichstein's Substance S (X).

Pregnenolone esters (inter alia, $\Delta^5$-3-acetoxy-20-keto-pregnene, $\Delta^5$-3-benzoxy-20-keto-pregnene, $\Delta^5$-3-propionoxy-20-keto-pregnene, and the like), employed as starting materials in the process of our invention, are readily prepared by acylating pregnenolone in accordance with procedures known in the art. Although other pregnenolone esters are suitable for use as starting materials in the process of our invention, we generally prefer to employ a lower aliphatic acid ester, such as the acetate, since these esters are readily and conveniently prepared.

The first step of our process comprising the formation of the 5,6-dichloro compound is readily effected by treating the starting material with chlorine. This is conveniently accomplished by intimately contacting the acylated pregnenolone derivative with chlorine in a suitable solvent medium, such as ether, benzene, halogenated hydrocarbons, and the like. For the obtainment of maximum yields under optimum conditions, we find it desirable to employ an amount of chlorine in slight excess over that theoretically required and to carry out the chlorination at a temperature below about 50° C. Thus, the chlorination of pregnenolone acetate is readily accomplished by mixing a chloroform solution of pregnenolone acetate and pyridine with a carbon tetrachloride solution of chlorine at a temperature of about —60° C. and allowing the resulting reaction mixture to warm up to about 15° C. Alternatively, the reaction can be carried out by passing chlorine into a solution of the pregnenolone ester in a mixture of benzene and pyridine at room temperature. After completion of the reaction, the solution is washed successively with dilute acid, dilute alkali and water to remove the pyridine and the solvent is evaporated by warming under diminished pressure to obtain the 5,6-dichloro compound which can be further purified by recrystallization from suitable solvents.

The second step of our process is effected by reacting the 5,6-dichloro compound with an excess of lower aliphatic acid anhydride or a lower aliphatic acid halide in the presence of a catalytic amount of a strong acid. The acylation is conveniently effected by heating the reactants at a temperature of about 60–110° C. for about one to six hours. Strong acids, such as concentrated sulfuric acid, benzene sulfonic acid, p-toluene sulfonic acid, and the like, are suitable catalysts for this reaction. For example, $\Delta^{17(20)}$-3,20-diacetoxy-5,6-dichloro-pregnene is conveniently obtained by heating 3-acetoxy-5,6-dichloro-20-keto-pregnane with acetic anhydride in the presence of p-toluene sulfonic acid on a steam bath for about four to five hours. After completion of the reaction, the product is recovered by decomposing the excess acetic anhydride with water, extracting the resulting aqueous solution with a suitable solvent such as ether, benzene, chloroform, carbon tetrachloride, ethyl acetate and the like, and evaporating the extracts.

The oxidation of the enol acylate (III) to the corresponding epoxy compound (IV) is effected by intimately contacting the enol acylate with an organic peroxy acid in a suitable solvent medium. Organic peroxy acids suitable as oxidizing agents for this reaction that might be mentioned include performic acid, peracetic acid, perbenzoic acid, perphthalic acid, and the like. Solvents for the reactants, for example, benzene, ether, halogenated hydrocarbons, saturated hydrocarbons, and the like, are suitable reaction mediums. Thus, 3,20-diacetoxy-5,6-dichloro-17,20-epoxy-pregnane is prepared by adding a benzene solution of perbenzoic acid, or preferably an ethyl acetate solution of perphthalic acid, to $\Delta^{17(20)}$-3,20-diacetoxy-5,6-dichloro-pregnene at a temperature of about 10° C., allowing the resulting reaction mixture to warm up to room temperature, and permitting the reaction to continue at room temperature until the oxidation is substantially complete. At this point the mixture is washed with alkali to remove the excess perbenzoic acid, and the resulting benzene layer is evaporated under diminished pressure to obtain the desired epoxy compound.

The hydrolysis of the epoxide (IV) to form the corresponding 17α-hydroxy-20-keto compound (V) is effected by treating IV with an alkali or acid in an aqueous alcoholic medium. Alkalis such as alkali metal hydroxides, carbonates and bicarbonates, and acids such as mineral acids, are suitable for effecting this hydrolysis. For example, 3-17α-dihydroxy-5,6-dichloro-20-keto-pregnane is produced by adding a solution of 3,20-diacetoxy-5,6-dichloro-17,20-epoxy-pregnane in hot methanol to a solution of potassium hydroxide in aqueous methanol and maintaining the resulting reaction mixture at about 25° C. After the hydrolysis is completed by stirring the reaction mixture at room temperature for about an hour, the product is recovered by neutralizing the reaction mixture with acetic acid, and evaporating the resulting neutralized solution during which process the product crystallizes.

The conversion of V to the corresponding 21-bromo compound is carried out by adding a slight molar excess of bromine to the steroid dissolved in a suitable inert organic solvent such as an ether, an aromatic or aliphatic hydrocarbon, a halogenated hydrocarbon, and the like at a temperature of about 25–100° C. For example, 3-17α-dihydroxy-5,6-dichloro-20-keto-21-bromo-pregnane is obtained by adding a solution of bromine in chloroform to a chloroform solution of 3-17α-dihydroxy-5,6-dichloro-20-keto-pregnane and maintaining the reaction mixture at about 40–55° C. After completion of the reaction, the reaction mixture is washed with an aqueous solution of sodium bicarbonate, and the product is obtained in crystalline form by evaporating the chloroform solution to a small volume.

The conversion of the 21-bromo compound (IV) to the 21-acyloxy compound (VII) can be accomplished by several methods. The reaction can be carried out by direct metathesis with an alkali metal salt of a lower aliphatic acid. This reaction is conveniently accomplished by heating a solution of the 21-bromo compound in a suitable solvent such as acetone, with the alkali metal salt for about 4–15 hours. The alkali metal salt can be added to the reaction mixture directly or formed in situ by the reaction of equivalent amounts of the organic carboxylic acid and an alkali metal hydroxide or carbonate.

Alternatively, the 21-bromo compound can be first converted to the 21-iodo compound by treatment with an iodide salt, for example sodium iodide, and the resulting iodo compound converted by metathesis as described above, to the desired 21-acyloxy compound.

Further, as will be apparent to those skilled in the art, the 21-acyloxy compound is also conveniently obtained by reacting the iodide salt and the alkali metal carboxylic acid salt concurrently with the 21-bromo compound. This method is generally preferred in carrying out this step of our process. Thus, 3-17α-dihydroxy-5,6-dichloro-20-keto-21-acetoxy-pregnane is conveniently prepared by refluxing a mixture of 3-17α-dihydroxy-5,6-dichloro-20-keto-21- bromo-pregnane, acetone, potassium acetate, acetic acid and sodium iodide for about 4-5 hours. After adding water to the resulting reaction mixture, and distilling off the acetone, the desired 21-acetoxy compound can be recovered in crystalline form.

The oxidation of the 3-hydroxyl group of compound VII to the 3-keto group of VIII is effected by treatment with suitable strong oxidizing agents. This reaction is most conveniently effected by treatment with chromium trioxide in an aqueous solution of acetic and sulfuric acids at a temperature of about 0-20° C. For example, 3,20-diketo-5,6-dichloro-17α-hydroxy-21-acetoxy-pregnane is obtained by intimately contacting 3-17α-dihydroxy-5,6-dichloro-20-keto-21-acetoxy-pregnane with chromium trioxide in an acetic acid-sulfuric acid reaction medium. The recovery of the oxidized product is effected by extraction of the product from the reaction mixture with a suitable solvent such as chloroform, carbon tetrachloride, benzene and the like.

The removal of chlorine from Compound VIII to produce the corresponding ester of $\Delta^4$-3,20-diketo-17α,21-dihydroxy-pregnene is effected by treating VIII with a dehalogenating agent. Thus, this dehalogenation is readily accomplished by heating VIII with zinc or chromous chloride. For example, $\Delta^4$-3,20-diketo-17α-hydroxy-21-acetoxy-pregnene is produced by intimately contacting 3,20 - diketo - 5,6-dichloro-17α-hydroxy-21-acetoxy-pregnane with zinc in an acetic acid medium at a temperature of about 40-80° C. After the reaction is complete, the reaction mixture is filtered and the desired product is recovered in crystalline form by adding water to the resulting filtrate and cooling the aqueous solution.

The esters of $\Delta^4$-3,20-diketo-17α,21-dihydroxy-pregnene so obtained can be hydrolyzed by treatment with alkali to obtain Reichstein's Substance S.

In accordance with a further embodiment of the present invention, it is found that $\Delta^4$-3,20-diketo-17α-hydroxy-pregnene is produced by oxidizing 3-hydroxy-5,6-dichloro-17α-hydroxy-20-keto-pregnane to obtain the corresponding 3-keto compound, and dehalogenating the latter compound. This process can be shown as follows:

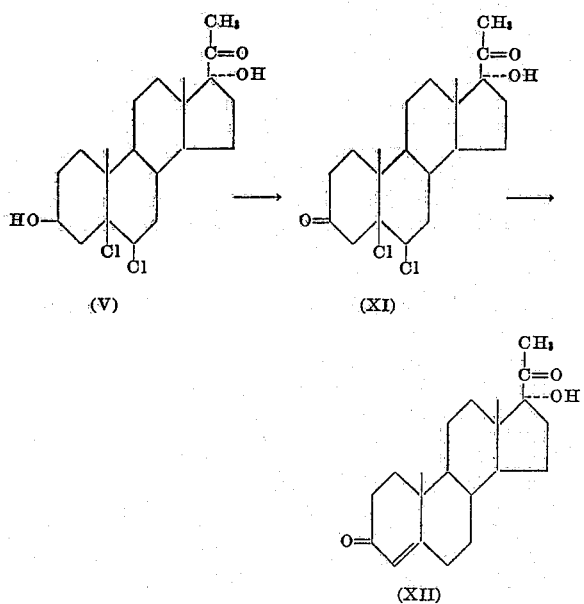

The oxidation of V to obtain the 3-keto compound is effected by reacting V with a strong oxidizing agent. Thus, this reaction is conveniently effected by reacting 3-hydroxy-5,6-dichloro-17α-hydroxy - 20 - keto - pregnane with chromium trioxide in the presence of acetic acid and sulfuric acid. The 3-keto compound is recovered by adding water to the reaction mixture, extracting the resulting aqueous solution with a suitable solvent such as chloroform, and evaporating the solvent extracts.

The dehalogenation of XI to produce $\Delta^4$-3,20-diketo-17α-hydroxy-pregnene can be accomplished as described above for converting Compound VIII to Compound IX. Thus, the reaction is effected by treating 3,20-diketo-5,6-dichloro-17α-hydroxy-pregnane in acetone solution with chromous chloride. The dehalogenated product is recovered in crystalline form by concentrating the resulting reaction mixture under diminished pressure until the product precipitates and filtering the resulting concentrate.

In the step of removing the chloro substituents from 3,20-diketo-5,6-dichloro-17α,21-dihydroxy - pregnane and 3,20-diketo-5,6-dichloro-17α-hydroxy-pregnane, the initial reaction product is believed to be the $\Delta^5$ compound which readily isomerizes to form the corresponding $\Delta^4$ compound. This isomerization is conveniently effected by treating the reaction product with a small amount of an acid such as sulfuric acid.

The products, $\Delta^4$-3,20-diketo - 17α,21 - dihydroxy-pregnene, the esters of $\Delta^4$-3,20-diketo-17α,21-dihydroxy-pregnene, and $\Delta^4$-3,20-diketo-17α-hydroxy-pregnene which are obtained in accordance with the processes of the present invention can be treated by microbiological fermentation processes to introduce an oxygen containing substituent at C-11. Thus, these compounds are useful intermediates in the preparation of cortisone, and hydrocortisone, and similar related compounds.

It was indeed unexpected to find that the 5,6-double bond could be protected by the addition of chlorine in the process of our invention. Other attempts to protect this double bond by the addition of hydrogen chloride or the addition of bromine were unsuccessful. The addition of HCl caused some epimerization at C-17, and the derivative so obtained would have eliminated hydrogen chloride under the reaction conditions of our process. Similarly, when the double bond is protected by the addition of bromine, the dibromo derivative of the pregnenolone ester is also unsatisfactory for use in the process of our invention. The dibromo derivative loses hydrogen bromide under the conditions of enol acylation. Also the dibromide was not suitable for use in the later steps of our process.

The following examples serve to illustrate methods of carrying out the processes of the present invention.

EXAMPLE 1

*3-acetoxy-5,6-dichloro-20-keto-pregnane*

The starting material, pregnenolone acetate, may be conveniently prepared from pregnenolone as follows: A suspension of pregnenolone (100 g.) in acetic anhydride (333 ml.) was heated to reflux, the solid all dissolving. The solution was refluxed 3.5 hours and then chilled slowly, with seeding, finally chilling in ice. The crystals of pregnenolone acetate were collected, washed with cold methanol and dried at room temperature.

Pregnenolone acetate (152 g., 0.425 mole) was dissolved in chloroform (1500 ml.) and cooled to —20° C. A solution of chlorine in chloroform was prepared by passing chlorine gas into chloroform and on titration iodimetrically against thiosulfate was found to be 0.689 M. A 650 ml. portion (1.05×0.425 mole) was added rapidly (a few minutes) to the steroid solution, maintaining the temperature below —20° C. The solution was then concentrated under reduced pressure with a minimum of heat, flushed with acetone, and pumped dry. The residue was crystallized by dissolving in 800 ml. of boiling acetone, chilling, filtering, and washing with cold acetone. After drying to constant weight on the funnel, the product, 3-acetoxy-5,6-dichloro-20-keto-pregnane, melted at 194-196.6° C.

The product may be recrystallized from methanol. The pure compound melted at 196.6-198° C. The rotation was +6.5° (C=1, chloroform).

EXAMPLE 2

*3-acetoxy-5,6-dichloro-20-keto-pregnane*

To a solution of 25 g. of pregnenolone acetate in 940 ml. of chloroform was added 6 ml. of pyridine. The solution, protected from atmospheric moisture by drying tubes, was cooled to −60° C. and 79 cc. of a 0.93 M solution of chlorine in carbon tetrachloride was added with stirring. A precipitate (complex of pyridine and chlorine) formed. The mixture was allowed to warm to 15° C. with stirring and with dissolution of the precipitate to give a colorless solution. The solution was washed successively with excess dilute hydrochloric acid, water, 5% aqueous sodium bicarbonate and finally water. The solution was dried and concentrated and the residue was flushed with acetone and recrystallized from acetone to yield 3-acetoxy-5,6-dichloro-20-keto-pregnane melting at 193–197° C.

EXAMPLE 3

*$\Delta^{17(20)}$-3,20-diacetoxy-5,6-dichloro-pregnene*

A solution of 3-acetoxy-5,6-dichloro-20-keto-pregnane (106.25 g., 0.248 mole) and p-toluene sulfonic acid monohydrate (14.16 g., 0.0745 mole) in acetic anhydride (558 ml.) was heated on the steam bath for 4.5 hours. The brown solution was cooled to 10° C. and water (2235 ml.) at 10° C. was added rapidly to hydrolyze the excess acetic anhydride. The mixture was agitated and the temperature was kept below 30° C. by occasional cooling. A granular solid separated after about 15 minutes. After another 15 minutes the mixture was extracted with ether (3×400 ml.). The combined ether extracts were washed with water (3×800 ml.), 10% sodium carbonate solution (2×320 ml.) and water (3×800 ml.). The ether solution was dried over sodium sulfate and concentrated under reduced pressure. The residue was flushed with benzene and the solvent removed under diminished pressure to obtain $\Delta^{17(20)}$-3,20-diacetoxy-5,6-dichloropregnene which was used directly in the next step.

EXAMPLE 4

*3,20-diacetoxy-5,6-dichloro-17,20-epoxy-pregnane*

To the $\Delta^{17(20)}$-3,20-diacetoxy-5,6-dichloro-pregnene (0.248 mole) was added 910 ml. (1.5×0.248 moles) of perbenzoic acid in benzene solution at 10° C. The solution was allowed to warm to room temperature and was titrated periodically. After 4.75 hours 88% of the theoretical amount of perbenzoic acid was consumed. The solution was washed free of perbenzoic acid with cold 0.5 N sodium hydroxide (3×1000 ml.), to neutrality with water (3×1000 ml.), was dried over sodium sulfate and concentrated to dryness under reduced pressure. The amorphous residue was flushed with methanol, becoming crystalline. This residue was boiled with methanol (120 ml.) but did not dissolve. The suspension was chilled and filtered, and the crystalline product, 3,20-diacetoxy-5,6-dichloro-17,20-epoxy-pregnane, was washed with cold methanol and dried.

EXAMPLE 5

*3,20-diacetoxy-5,6-dichloro-17,20-epoxy-pregnane*

To 0.139 gram-mole of $\Delta^{17(20)}$-3,20-diacetoxy-5,6-dichloro-pregnene (previously flushed with ethyl acetate) was added 600 ml. of a 0.487 molar solution of monoperphthalic acid in ethyl acetate (cold). The solid rapidly dissolved and the solution warmed itself to 30° C. The reaction was largely complete in three hours but was allowed to stand 2.5 days. The solution was washed free of peracid with cold 0.5 N sodium hydroxide (3×600 ml.) and to neutrality with water (3×600 ml.), was dried over sodium sulfate and concentrated to dryness under reduced pressure. The residue was slurried with boiling methanol (70 ml.) and then chilled and filtered. The crystals were washed with cold methanol and dried, yielding 3,20-diacetoxy-5,6-dichloro-17,20-epoxy-pregnane.

EXAMPLE 6

*3,17α-dihydroxy-5,6-dichloro-20 keto-pregnane*

A solution of potassium hydroxide (96.3 g., 1.72 moles) in water (180 ml.) plus methanol (717 ml.) was prepared and cooled to 25° C. A solution of 3,20-diacetoxy-5,6-dichloro-17,20-epoxy-pregnane (84 g., 0.172 mole) in boiling methanol (1000 ml.) was added over fifteen minutes, maintaining the temperature at 25° C. with an ice bath. The reaction was stirred for an hour at room temperature, during which time a small amount of product precipitated. The mixture was neutralized with acetic acid (84 ml.) and concentrated to a small volume under reduced pressure. Water (717 ml.) was added and after chilling, the crystals of 3,17α-dihydroxy-5,6-dichloro-20-keto-pregnane were collected, washed three times with water, and dried. The product melted at 194–194.8° C. dec. Upon recrystallization the product was found to melt at 203–204° C. dec.

EXAMPLE 7

*3,17α-dihydroxy-5,6-dichloro-20-keto-pregnane*

Five grams of 3,20-diacetoxy-5,6-dichloro-17,20-epoxy-pregnane obtained in Example 5 was dissolved in boiling methanol (202 ml.). A solution of potassium bicarbonate (6.15 g.) in water (20.2 ml.) was added and the mixture was refluxed for three hours. Water was added, and the methanol was removed under reduced pressure, crystallization occurring in the process. The resulting aqueous suspension was chilled and filtered, and the crystals were washed with water and dried to give 3,17α-dihydroxy-5,6-dichloro-20-keto-pregnane, melting at 192–196° C. (dec.).

EXAMPLE 8

*3,17α-dihydroxy-5,6-dichloro-20-keto-21-bromo-pregnane*

3,17α-dihydroxy-5,6-dichloro-20-keto-pregnane (4.03 g., 10 mM.) was dissolved in warm chloroform (120 ml.). A solution of bromine (11 mM.) in chloroform (28.1 ml. total volume) was added over a period of one hour maintaining the reaction at 46–48° C. The solution was washed with 10% sodium bicarbonate solution (50 ml.) and water (50 ml.). The chloroform solution was concentrated under reduced pressure and the residue became crystalline on warming in a small amount of methanol. After chilling, the crystals of 3,17α-dihydroxy-5,6-dichloro-20-keto-21-bromo-pregnane were collected, washed with a little cold methanol, and dried. The product melted with decomposition at 179.5–181.5° C.

EXAMPLE 9

*3,17α-dihydroxy-5,6-dichloro-20-keto-21-acetoxy-pregnane*

The bromo ketone prepared in Example 8 (3.00 g.) was dissolved in acetone (90 ml.) and potassium acetate (3.28 g.), acetic acid (1.00 ml.) and sodium iodide (1.56 g.) were added. The suspension was refluxed with stirring for 4.5 hours, developing a slight iodine color at the start which soon disappeared. Water was added and the acetone was distilled off. After cooling, the microcrystalline solid, 3,17α-dihydroxy-5,6-dichloro-20-keto-21-acetoxy-pregnane, was filtered off, washed with water and dried. It decomposed at 187–190° C.

EXAMPLE 10

*3,17α-dihydroxy-5,6-dichloro-20-keto-21-acetoxy-pregnane*

A mixture of 0.32 g. of 3,17α-dihydroxy-5,6-dichloro-20-keto-21-bromo-pregnane, 1.0 g. of potassium acetate and 25 cc. of acetone was refluxed for four hours. Water (50 ml.) was added and the acetone was removed under reduced pressure. The resulting crystalline suspension was chilled and filtered and the crystals were washed with water and dried. When dry the product melted at 188–192° C. (dec.). Its infrared spectrum was the same as that of an authentic specimen of 3,17α-dihydroxy-5,6-dichloro-20-keto-21-acetoxy-pregnane.

EXAMPLE 11

*3,20-diketo-5,6-dichloro-17α-hydroxy-21-acetoxy-pregnane*

One gram of 3,17α-dihydroxy-5,6-dichloro-20-keto-21-acetoxy-pregnane was dissolved in acetic acid (20 ml.) and water (2 ml.) was added to prevent freezing. The solution was chilled in an ice bath. A solution of chromium trioxide (0.216 g.) in water (0.2 ml.) plus acetic acid (2.5 ml.) was added over ten minutes while stirring in the ice bath. Sulfuric acid (conc., 0.121 ml.) was then added over two minutes as stirring continued, in the ice bath. After 20 minutes a heavy precipitate had formed. After 70 minutes further, the mixture was shaken with chloroform (50 ml.), and water (50 ml.). The chloroform layer was washed with 2.5% sodium bicarbonate solution (3×50 ml.) and water (50 ml.), with back washing with small amounts of chloroform. The chloroform solution was dried over sodium sulfate and concentrated under reduced pressure. The crystalline residue, 3,20-diketo-5,6-dichloro-17α-hydroxy-21-acetoxy-pregnane, was washed onto a funnel with anhydrous ether. The white fibers of 3,20-diketo-5,6-dichloro-17α-hydroxy-21-acetoxy-pregnane decomposed at 198–198.5° C.

EXAMPLE 12

*$\Delta^4$-3,20-diketo-17α-hydroxy-21-acetoxy-pregnene*

0.5 g. of 3,20-diketo-5,6-dichloro-17α-hydroxy-21-acetoxy-pregnane was dissolved in warm acetic acid (25 ml.) and with stirring was treated over a period of one hour with zinc dust in five portions of 0.1 g. each at progressively increasing temperatures beginning at 40° C. and ending at 80° C. The mixture was filtered and the cake was washed with acetic acid (10 ml.). The filtrate plus wash was diluted slowly with water (140 ml.) and the suspension was chilled for two hours and filtered. The crystals of $\Delta^4$-3,20-diketo-17α-hydroxy-21-acetoxy-pregnene (Substance S acetate) were washed with water, dried, and recrystallized from acetone.

EXAMPLE 13

*$\Delta^4$-3,20-diketo-17α-hydroxy-21-acetoxy-pregnene*

A solution of chromous chloride was prepared by treating a solution of chromic chloride (10 g.) in water (40 ml.) containing concentrated hydrochloric acid (4. ml.) with amalgamated zinc dust (20 g.). The solution of chromous chloride was added to a solution of 3,20-diketo-5,6-dichloro-17α-hydroxy-21-acetoxy-pregnane (0.50 g.) in acetone (70 ml.) under a carbon dioxide atmosphere. After a few minutes standing at room temperature crystallization occurred. After an hour water was added and the acetone was removed under reduced pressure. The resulting suspension of crystals was chilled and the crystals were collected, washed with water and dried, giving material melting at 218–225° C. This material showed λ max. at 2410 with E% of 267, indicating that about 60% of the $\Delta^5$-3,20-diketo-17α-hydroxy-21-acetoxy-pregnene had already been isomerized to Substance S acetate. Complete isomerization was effected by adding to a hot solution of 0.100 g. of the material in acetone (5 ml.) 6 drops of a solution prepared from 0.3 ml. of concentrated sulfuric acid and 10 ml. of acetone. The solution was boiled for six minutes then cooled and the resulting crystals of Substance S acetate were separated. After drying, the product melted at 234–236° C., showed λ max. at 2400 A. (E%=419) and its infrared spectrum was identical with the infrared spectrum of an authentic specimen of Substance S acetate.

EXAMPLE 14

*3,20-diketo-5,6-dichloro-17α-hydroxy-pregnane*

Ten grams of 3-hydroxy-5,6-dichloro-17α-hydroxy-20-keto-pregnane was dissolved in glacial acetic acid (350 ml.). Water (35 ml.) was added and the solution was cooled to 4° C. A solution of 2.48 g. of chromium trioxide in 2.48 ml. of water and 22 ml. of acetic acid was added over four minutes with stirring and in an ice bath. Concentrated sulfuric acid (1.4 ml.) was added over five minutes and then the reaction mixture was stirred further in the ice bath for 100 minutes. The mixture was then shaken with chloroform (437 ml.) and water (700 ml.). The aqueous layer was separated and reextracted with chloroform (100 ml.). The combined chloroform layer was washed with water (500 ml.), 2.5% aqueous sodium bicarbonate solution (2×500 ml.) and water (500 ml.). The chloroform solution was dried with sodium sulfate and concentrated under reduced pressure with a minimum of heat. The residue was slurried with ether, filtered, washed with ether and dried. The 17α-hydroxy-5,6-dichloro-3,20-diketo-pregnane so obtained decomposed at 145–160° C.

EXAMPLE 15

*$\Delta^4$-3,20-diketo-17α-hydroxy-pregnene*

To a solution of 6.13 g. of 17α-hydroxy-5,6-dichloro-3,20-diketo-pregnane (prepared as in Example 14) in acetone (800 ml.) was added 500 ml. of chromous chloride prepared as described in Example 13. The solution was concentrated under reduced pressure and the resulting suspension of crystals was chilled and filtered and the product was washed with water. When dry it melted at 170–205° C.

To a solution of 4.43 g. of the above material in acetone (100 ml.) at the boiling point was added 5.31 ml. of a solution of concentrated sulfuric acid (0.3 ml.) in acetone (10 ml.). The solution was boiled six minutes, 60 ml. of acetone distilling off in the process. The solution was chilled and the resulting crystals of 17α-hydroxyprogesterone were collected, washed with cold acetone and dried. The product, $\Delta^4$-3,20-diketo-17α-hydroxy-pregnene, melted at 210–215° C.

EXAMPLE 16

*3-acetoxy-5,6-dichloro-17α-hydroxy-20-keto-pregnane*

A mixture of 5.00 g. of 3,20-diacetoxy-5,6-dichloro-17,20-epoxy pregnane, 30 cc. of methanol and 0.1 cc. of concentrated aqueous hydrochloric acid solution was prepared and heated at reflux temperature for a period of approximately 30 minutes. The mixture was then chilled in an ice bath and the resulting crystals of 3-acetoxy-5,6-dichloro-17α-hydroxy-20-keto-pregnane were filtered and washed with cold methanol. The crystalline product was then dried and recrystallized from acetone to give essentially pure 3-acetoxy-5,6-dichloro-17α-hydroxy-20-keto-pregnane, M. P. 211–218° C. dec.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting a pregnenolone ester of a lower fatty acid with chlorine to form the corresponding 5,6-dichloro compound, treating said dichloro compound with a member from the group consisting of lower fatty acid anhydrides and lower fatty acid halides in the presence of a strong acid to produce the corresponding $\Delta^{17(20)}$-enol acylate, reacting said enol acylate with an organic peroxy acid to produce the corresponding 17,20-epoxy derivative, hydrolyzing said epoxy derivative to produce 3,17α-dihydroxy-5,6-dichloro-20- keto-pregnane, intimately contacting said pregnane with bromine to produce the corresponding 21-bromo compound, reacting said bromo compound with an alkali metal salt of a lower fatty acid to produce the corresponding 21-acyloxy compound, treating said acyloxy compound with an oxidizing agent to produce the corresponding 3-keto compound, and intimately contacting said keto compound with a dehalogenating agent to obtain a pregnane compound of the formula

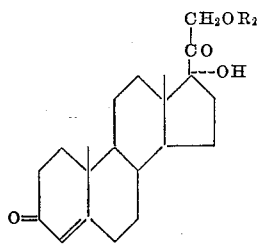

wherein $R_2$ is a lower fatty acid radical.

2. The process which comprises reacting pregnenolone acetate with chlorine to product 3-acetoxy-5,6-dichloro-20-keto-pregnane, treating said dichloro compound with acetic anhydride in the presence of p-toluene sulfonic acid to obtain $\Delta^{17(20)}$-3,20-diacetoxy-5,6-dichloro-pregnene, intimately contacting the resulting enol acetate with perphthalic acid to produce 3,20-diacetoxy-5,6-dichloro-17,20-epoxy-pregnane, reacting said epoxy compound with potassium bicarbonate in aqueous methanol to produce 3,17α - dihydroxy-5,6-dichloro - 20 - keto-pregnane, intimately contacting said product with bromine to produce 3,17α-dihydroxy-5,6-dichloro-20-keto-21-bromo-pregnane, reacting said bromo compound with potassium acetate and sodium iodide to produce 3,17α-dihydroxy-5,6-dichloro - 20 - keto-21-acetoxy-pregnane, reacting said acetoxy-compound with chromium trioxide in the presence of acetic acid and sulfuric acid to obtain the corresponding 3-keto compound, and treating said keto compound with chromous chloride to produce $\Delta^4$-3,20-diketo-17α-hydroxy-21-acetoxy-pregnene.

References Cited in the file of this patent

Heer: Helv. Chim. Acta 34, 359–72 (1941).